United States Patent
Min et al.

(10) Patent No.: US 10,885,627 B2
(45) Date of Patent: Jan. 5, 2021

(54) UNSUPERVISED NEIGHBOR-PRESERVING EMBEDDING FOR IMAGE STREAM VISUALIZATION AND ANOMALY DETECTION

(71) Applicant: NEC Laboratories America, Inc., Princeton, NJ (US)

(72) Inventors: Renqiang Min, Princeton, NJ (US); Farley Lai, Plainsboro, NJ (US); Eric Cosatto, Red Bank, NJ (US); Hans Peter Graf, South Amboy, NJ (US)

(73) Assignee: NEC Corporation

( * ) Notice: Subject to any disclaimer, the term of this patent is extended or adjusted under 35 U.S.C. 154(b) by 105 days.

(21) Appl. No.: 16/371,552

(22) Filed: Apr. 1, 2019

(65) Prior Publication Data

US 2019/0304079 A1   Oct. 3, 2019

Related U.S. Application Data (60) Provisional application No. 62/651,936, filed on Apr. 3, 2018.

(51) Int. Cl.
| | | |
|---|---|---|
| *G06K 9/00* | (2006.01) | |
| *G06T 7/00* | (2017.01) | |
| *G06F 16/56* | (2019.01) | |
| *G06N 3/08* | (2006.01) | |

(52) U.S. Cl.
CPC .............. *G06T 7/001* (2013.01); *G06F 16/56* (2019.01); *G06N 3/08* (2013.01); *G06T 2207/20076* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 9,633,108 | B2* | 4/2017 | Nachev | G06K 9/6284 |
| 10,593,033 | B2* | 3/2020 | Niculescu-Mizil | G16H 50/70 |
| 2014/0201126 | A1* | 7/2014 | Zadeh | A61B 5/165 |
| | | | | 706/52 |
| 2017/0076224 | A1* | 3/2017 | Munawar | G06N 3/084 |
| 2017/0293838 | A1* | 10/2017 | Min | G06N 3/0454 |
| 2018/0374207 | A1* | 12/2018 | Niculescu-Mizil | G06T 11/008 |
| 2019/0244513 | A1* | 8/2019 | Niculescu-Mizil | G06T 3/403 |
| 2020/0026958 | A1* | 1/2020 | An | G06F 16/583 |

OTHER PUBLICATIONS

A Non-linear Dimensionality Reduction Method for Improving Nearest Neighbour Classification, Renqiang Min, University of Toronto, 2005, pp. 1-94 (Year: 2005).*

(Continued)

*Primary Examiner* — Jayesh A Patel
(74) *Attorney, Agent, or Firm* — Joseph Kolodka (57) ABSTRACT

Methods and systems for detecting and correcting anomalous inputs include training a neural network to embed high-dimensional input data into a low-dimensional space with an embedding that preserves neighbor relationships. Input data items are embedded into the low-dimensional space to form respective low-dimensional codes. An anomaly is determined among the high-dimensional input data based on the low-dimensional codes. The anomaly is corrected.

18 Claims, 7 Drawing Sheets

(56) References Cited

OTHER PUBLICATIONS

Regions of Inaccurate Modeling for Robot Anomaly Detection and Model Correction, Juan Pablo Mendoza, Carnegie Mellon University, Apr. 26, 2017, pp. 1-151 (Year: 2017).*

Martin Renqiang Min et al., "Exemplar-centered Supervised Shallow Parametric Data Embedding", Proceedings of the Twenty-Sixth International Joint Conference of Artificial Intelligence, Aug. 2017.

Laurens Van Der Maaten et al., "Learning a Parametric Embedding by Preserving Local Structure", Proceedings of the Twelfth International Conference on Artificial Intelligence and Statistics, Apr. 2009.

Renqiang Min, "A Non-linear Dimensionality Reduction Method for Improving Nearest Neighbour Classification", A dissertation presented to the Faculty of Department of Computer Science University of Toronto, Dec. 2004.

* cited by examiner

UNSUPERVISED NEIGHBOR-PRESERVING EMBEDDING FOR IMAGE STREAM VISUALIZATION AND ANOMALY DETECTION

RELATED APPLICATION INFORMATION

This application claims priority to U.S. Provisional Patent Application No. 62/651,936, filed on Apr. 3, 2018, incorporated herein by reference herein its entirety.

BACKGROUND

Technical Field

The present invention relates to visual anomaly detection and, more particularly, to the embedding of high-dimensional data in a low-dimensional space to aid in visualization of images and anomaly detection.

Description of the Related Art

Image information can be used to perform quality control on large numbers of manufactured goods. By comparing images across large numbers of a product, anomalies can be detected and corrected or disposed of. However, the large amount of data involved makes it difficult to identify anomalies manually, and the high dimensionality of image information introduces noise to automated systems.

SUMMARY

A method for detecting and correcting anomalous inputs includes training a neural network to embed high-dimensional input data into a low-dimensional space with an embedding that preserves neighbor relationships. Input data items are embedded into the low-dimensional space to form respective low-dimensional codes. An anomaly is determined among the high-dimensional input data based on the low-dimensional codes. The anomaly is corrected.

A system for detecting and correcting anomalous inputs includes a neural network configured to embed high-dimensional input data into a low-dimensional space. A training module is configured to train the neural network to embed the high-dimensional input data with an embedding that preserves neighbor relationships. An anomaly detector is configured to use the neural network to embed input data items into the low-dimensional space to form respective low-dimensional codes and to determine anomaly among the high-dimensional input data based on the low-dimensional codes. An anomaly correction module is configured to correct the anomaly.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention embed high-dimensional image information into a lower-dimensional space in such a way as to maintain locality between similar images. This makes it possible to perform accurate visualization of the images in a two-dimensional display, with similar images being grouped together, and also improves automatic classification of anomalous images by reducing redundant information and noise. The present embodiments can perform the embedding in an unsupervised fashion.

The present embodiments accept a stream of images as an input. To enable visualization of the incoming data stream, which can be very rapid in some embodiments, the present embodiments embed the high-dimensional image data into a low-dimensional (e.g., two-dimensional) space. The embeddings maintain nearest-neighbor relationships between the input images.

A neural network can be trained to perform the embedding and can be trained in an unsupervised fashion using small batches of input data. To address the fact that the pairwise similarities between data points in the small batches only account for a small fraction of all pairwise similarities between data points in a large training set, the present embodiments learn embedding parameters of an encoder by comparing high-dimensional data points with some representative high-dimensional exemplars and other data points in the same batch. The exemplars are initialized by a small number of iterations of k-means updates, with the option of including manually chosen exemplars, taking into account both local data density distributions and global clustering patterns of high-dimensional data. This makes the parametric embedding insensitive to batch size and scalable to large datasets.

Further, to ensure the local neighborhood structure in the high-dimensional space is well-coded in the low-dimensional space, a large-margin criterion is used to make the distance between each data point and its $k^{th}$ nearest neighbor always one margin smaller than its distance to its $(k+1)^{th}$ nearest neighbor. To make the parameters of the neural network capture intrinsic data variances, a decoder is used to reconstruct high-dimensional data points from corresponding low-dimensional codes. The exemplars are also updated by minimizing the reconstruction error of each data point based on a convex combination of the learned high-dimensional feature vectors of exemplars, in which the combination weights are the corresponding pairwise probabilities between the data point and the exemplars, calculated in the low-dimensional space.

Figure 1:
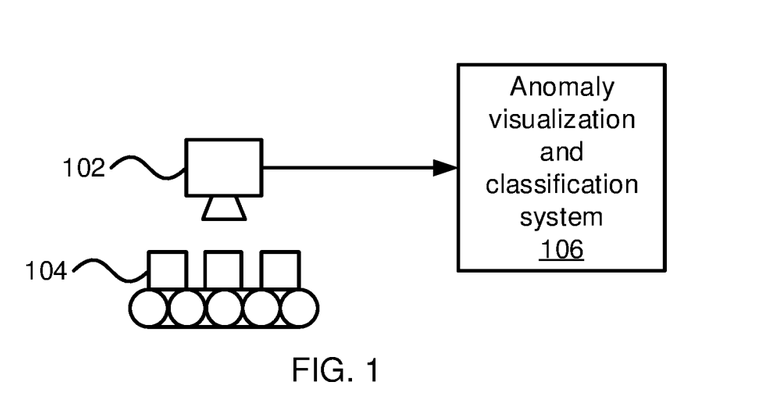
FIG. 1 is a diagram of anomaly detection and correction in a manufacturing system that takes images of products to determine whether the products are defective in accordance with an embodiment of the present invention.

Referring now to FIG. 1, a manufacturing process is shown. A camera 102 takes images of a series of products 104. In some embodiments, the products 104 are intended to be identical to one another, but can be defective for a wide variety of reasons, including manufacturing process variations, environmental variations, and human error. The images produced by the camera 102 can include multiple images for each product 104, for example capturing different views and different angles or under different lighting conditions, to reveal potential defects that may not be visible from a single view. Although the present embodiments are described in the specific context of identifying anomalous or defective products, it should be understood that the present embodiments can be applied to discriminate between any set of high-dimensional inputs to identify anomalies in the set.

The camera 102 can represent a single imaging device or can, alternatively, represent a number of distinct imaging devices. The camera 102 can furthermore represent any appropriate imaging technology, for example including digital cameras that operate in the visible spectrum, ultraviolet spectrum, infrared spectrum, or a combination of these spectra. The images generated by the camera 102 are represented with pixels and can be compared to one another to determine similarities according to an appropriate distance metric. Similar images are referred to herein as "neighbors." By default, such a comparison operates in a high-dimensional space, as each pixel in an image contributes to its "position." The large number of pixels yield a significant amount of redundant, noisy data and do a poor job of representing similarity in a way that is meaningful to a human observer.

The images are therefore passed to an anomaly visualization and classification system 106. The anomaly visualization and classification 106 embeds each image into a space of low-dimensionality, for example two dimensions. The images can then be visualized, using an appropriate display and user interface, for example with similar images being displayed close to one another on a two-dimensional field. In addition, unsupervised classification can be performed in the low-dimensional space, with the noise and redundant information from the images being effectively removed by the low-dimensional embedding.

Figure 2:
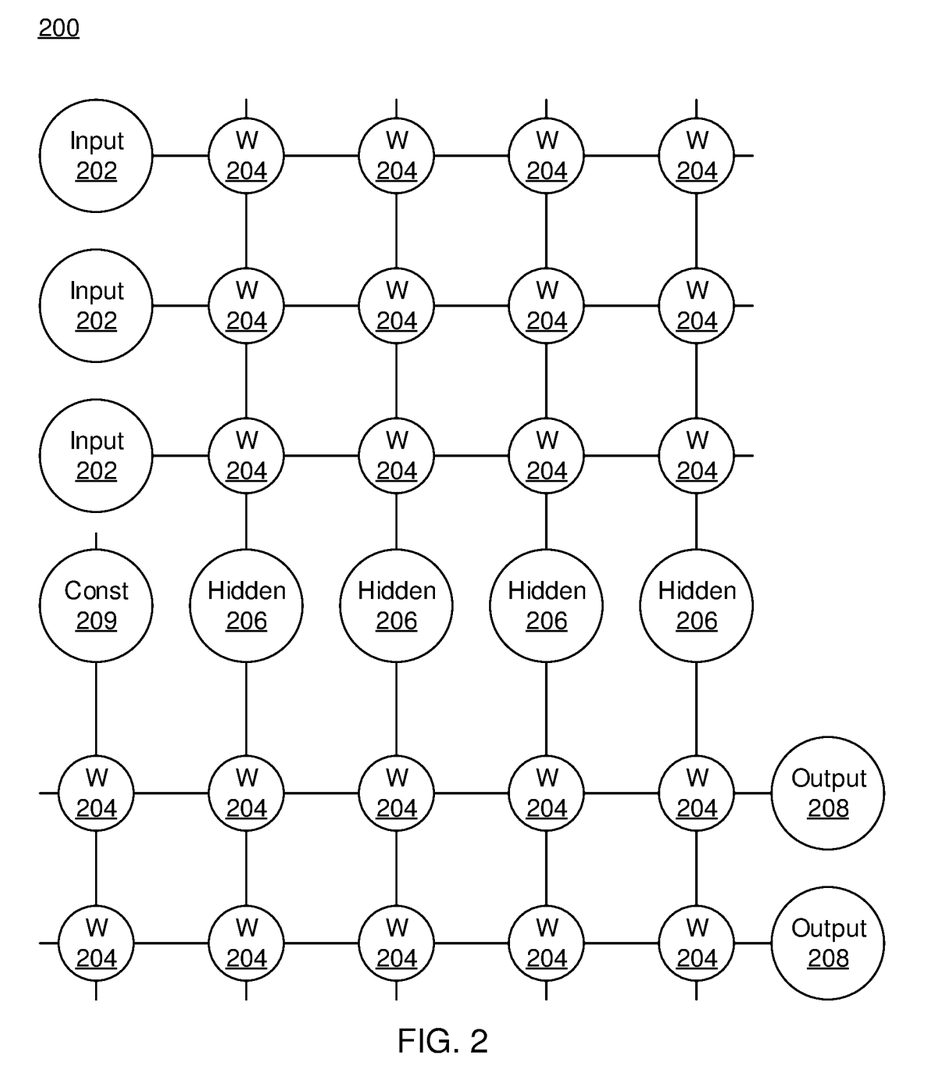
FIG. 2 is a diagram of a simple neural network architecture in accordance with an embodiment of the present invention.

Referring now to the drawings in which like numerals represent the same or similar elements and initially to FIG. 2, an artificial neural network (ANN) architecture 200 is shown. It should be understood that the present architecture is purely exemplary and that other architectures or types of neural network may be used instead. The ANN embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, rectified linear unit (ReLU) layers, pooling layers, fully connected layers, or any other appropriate type of neural network layer. Furthermore, layers can be added or removed as needed and the weights can be omitted for more complicated forms of interconnection.

During feed-forward operation, a set of input neurons 202 each provide an input signal in parallel to a respective row of weights 204. In the hardware embodiment described herein, the weights 204 each have a respective settable value, such that a weight output passes from the weight 204 to a respective hidden neuron 206 to represent the weighted input to the hidden neuron 206. In software embodiments, the weights 204 may simply be represented as coefficient values that are multiplied against the relevant signals. The signal from each weight adds column-wise and flows to a hidden neuron 206.

The hidden neurons 206 use the signals from the array of weights 204 to perform some calculation. The hidden neurons 206 then output a signal of their own to another array of weights 204. This array performs in the same way, with a column of weights 204 receiving a signal from their respective hidden neuron 206 to produce a weighted signal output that adds row-wise and is provided to the output neuron 208.

It should be understood that any number of these stages may be implemented, by interposing additional layers of arrays and hidden neurons 206. It should also be noted that some neurons may be constant neurons 209, which provide a constant output to the array. The constant neurons 209 can be present among the input neurons 202 and/or hidden neurons 206 and are only used during feed-forward operation.

During back propagation, the output neurons 208 provide a signal back across the array of weights 204. The output layer compares the generated network response to training data and computes an error. The error signal can be made proportional to the error value. In this example, a row of weights 204 receives a signal from a respective output neuron 208 in parallel and produces an output which adds column-wise to provide an input to hidden neurons 206. The hidden neurons 206 combine the weighted feedback signal with a derivative of its feed-forward calculation and stores an error value before outputting a feedback signal to its respective column of weights 204. This back propagation travels through the entire network 200 until all hidden neurons 206 and the input neurons 202 have stored an error value.

During weight updates, the stored error values are used to update the settable values of the weights 204. In this manner the weights 204 can be trained to adapt the neural network 200 to errors in its processing. It should be noted that the three modes of operation, feed forward, back propagation, and weight update, do not overlap with one another.

Figure 3:
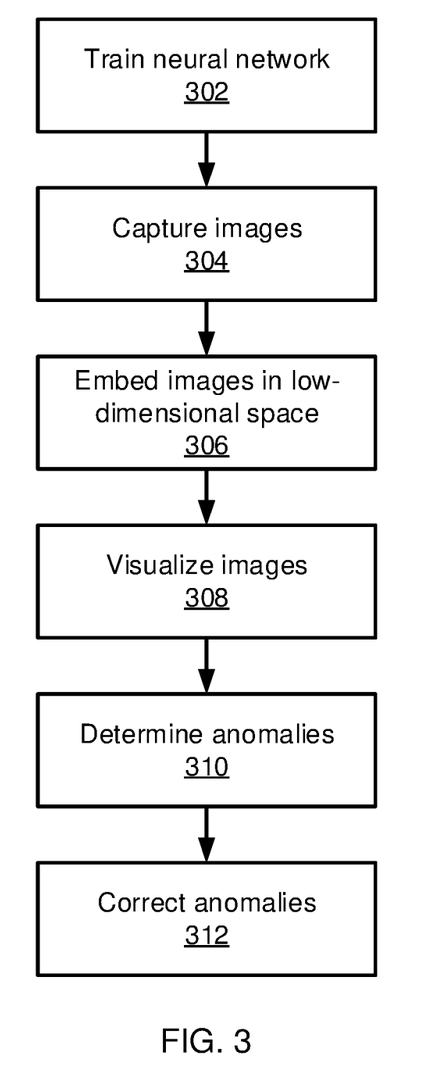
FIG. 3 is a block/flow diagram of a method for detecting and correcting anomalies using images that are embedded in a low-dimensional space in accordance with an embodiment of the present invention.

Referring now to FIG. 3, a method of manufacture with quality control is shown. Block 302 trains a machine learning system for embedding images into a low-dimensional space. It is specifically contemplated that a neural network can be used, as explained in greater detail below, but it should be understood that other machine learning systems can be used instead. Block 302 uses a large set of training data, which can include a large set of images. Additional detail regarding the training process in block 302 is provided below.

Block 304 then captures new images of products 104 using camera(s) 102. Block 306 uses the trained neural network to embed the captured new images into the low-dimensional space in such a way as to preserve locality between neighboring images. The embedded images may be referred to herein as low-dimensional codes for the images. The two-dimensional embedding can then be used by block 308 to visualize images, as the embeddings of respective images encode similarity information. For example, by determining images' embedding vectors in a two-dimensional space, a distance between any two images can be determined using an appropriate metric, such as the cosine similarity or a Euclidean distance. Visualization can then include displaying sets of images, with images that are closer to one another in the low-dimensional space being displayed closer to one another than images that are farther apart in the low-dimensional space.

Block 310 automatically determines whether a particular image represents an anomaly. Anomalies can be detected by comparing similar views of images across different products 104 to identify images that are farther away from the other images in the low-dimensional space than others. This can be determined by identifying images that have an above-threshold distance from the other images or by a clustering process that groups similar images together, identifying the outliers as being anomalies.

Block 312 then takes action to correct the anomalies. In some embodiments, correction of an anomaly can include automatically discarding anomalous products 104. In other embodiments, block 312 can flag the product 104 for further review by a human operator. In still other embodiments, block 312 can repair the anomaly (e.g., causing an imperfectly painted product to be re-painted).

Figure 4:
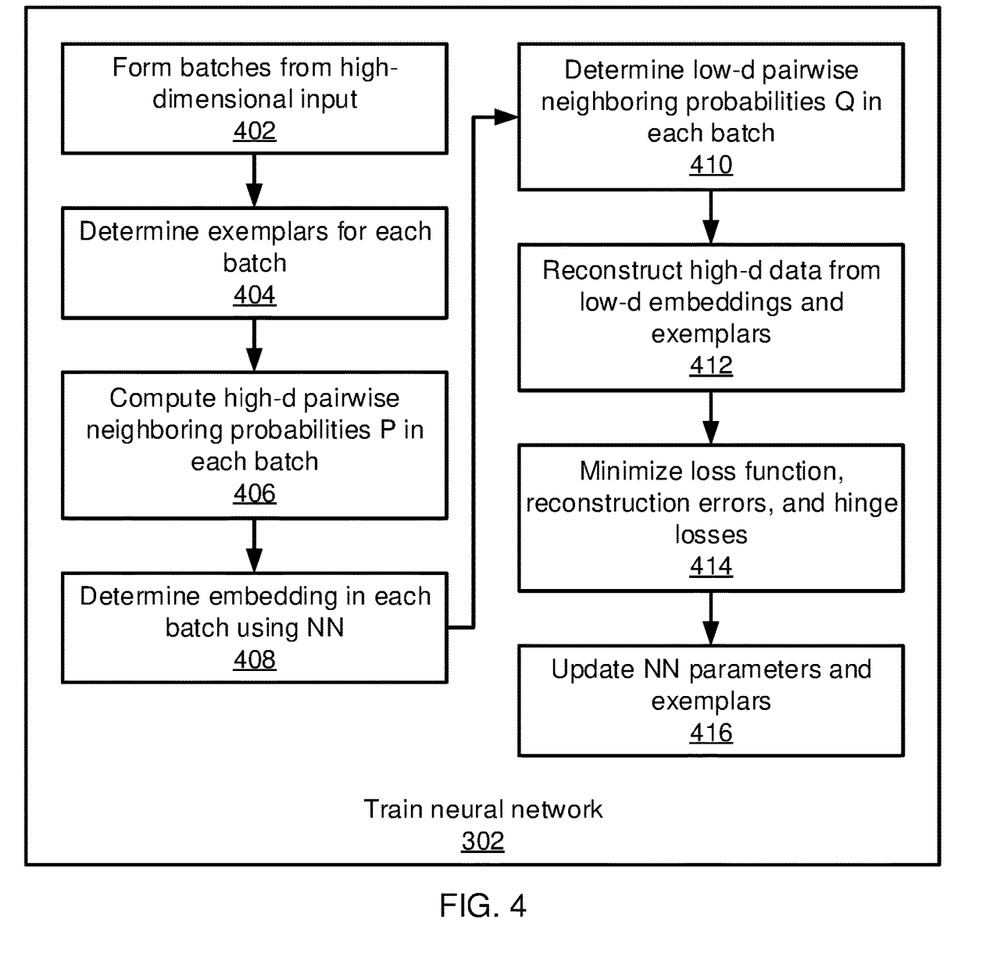
FIG. 4 is a block/flow diagram of a method for training a neural network in accordance with an embodiment of the present invention.

Referring now to FIG. 4, additional detail is shown regarding the training of the neural network in block 302. Block 402 forms batches from a large, high-dimensional input set. For example, in an input training data set that includes a million images, batches may be formed by randomly sampling 1024 images from that input set. It should be understood that any appropriate batch size can be selected instead.

Block 404 determines exemplars for each batch. Exemplars can be determined by running iterations of a k-means update or by random data sampling. The exemplars are used to determine neighboring probabilities between the exemplars and all other data points in the respective batch. The exemplars can be interpreted as landmarks that represent the entire dataset.

Block 406 determines pairwise neighboring probabilities P for the high-dimensional data in each batch. The pairwise probability between an image i and an image j are computed as:

$$p_{ij} = \frac{e^{-\frac{\|x^{(i)}-x^{(j)}\|^2}{2\sigma_i^2}}}{\sum_{k \neq i} e^{-\frac{\|x^{(i)}-x^{(k)}\|^2}{2\sigma_i^2}}}$$

where $x^{(i)}$ is a high-dimensional feature (e.g., a pixel) vector of i in the batch, $p_{(i|i)}=0$, $$p_{ij} = \frac{p(j|i) + p(i|j)}{2n},$$

n is the batch size, and $\sigma_i$ is set such that the perplexity of $p_i$ equals a user specified hyper-parameter u.

Block 408 determines the embedding in each batch using a neural network 408. Each image I goes through an encoder portion of the neural network to generate the low-dimensional embedding vector $f(x^{(i)})$.

Block 410 determines pairwise probabilities Q for the low-dimensional embeddings in each batch. Using the low-dimensional embedding vector $f(x^{(i)})$, the low-dimensional pairwise probabilities are calculated as:

$$q_{ij} = \frac{(1 + \|f(x^{(i)}) - f(x^{(j)})\|^2)^{-1}}{\sum_{k:k \neq l} (1 + \|f(x^{(i)}) - f(x^{(l)})\|^2)^{-1}}$$

$$q_{ii} = 0$$

Block 412 reconstructs the high-dimensional data from the low-dimensional embeddings and the exemplars. The functions $\|x^{(i)} - g(f(x^{(i)}))\|$ and $\|x^{(i)} - \Sigma_k \theta_{ik} e^{(k)}\|$ are minimized, where k=1, . . . , z, z is the total number of exemplars, and:

$$\theta_{ij} = \frac{(1 + \|f(x^{(i)}) - f(x^{(j)})\|)^{-1}}{\left[\sum_{l=1}^{z}(1 + \|f(x^{(i)}) - f(x^{(l)})\|^2)\right]^{-1}}$$

To make sure the $k^{th}$ nearest neighbor is always closer to image i than its $(k+1)^{th}$ nearest neighbor, the hinge-loss is minimized as follows:

$$\max(0, 1 + \|f(x^{(i)}) - f(NN(i,k))\| - \|f(x^{(i)}) - f(NN(i,k+1))\|)$$

where NN(i,k) denotes the $k^{th}$ nearest neighbor of the image i.

The exemplars are used to reconstruct the input images and $\theta_{ij}$ is similar to $q_{ij}$ but computed with a normalization over all exemplars. In contrast, $q_{ij}$ is computed with a normalization over all exemplars and other images in the same batch. The exemplars are used to reconstruct the image because the pre-defined exemplars, which were determined through k-means clustering or are manually chosen images that represent product defects, are updated to make sure the exemplars are representative of the whole data set and because the reconstruction term helps learn better low-dimensional embeddings. For example, if initial training has resulted in an encoder that produces inaccurate results, then $\theta_{ji}$ will not be meaningful, and the convex combination of the exemplars will not properly reconstruct the input image. The value of $\theta_{ij}$ is a scalar, where $\Sigma_j \theta_{ij} = 1$.

Block 414 minimizes a loss function, which includes a Kullback-Leibler (KL) loss, a series of reconstruction errors from the low-dimensional embeddings and the exemplars, and a series of neighborhood-preserving hinge losses. Using this minimization, block 416 updates the parameters of the neural network and the exemplars. The KL loss function can be expressed as:

$$KL(P \| Q) = \sum_{ij: i \neq j} p_{ij} \log \frac{p_{ij}}{q_{ij}}$$

where $$p_{ij} = \frac{e^{-\frac{\|x^{(i)}-x^{(j)}\|^2}{2\sigma_i^2}}}{\sum_{k \neq i} e^{-\frac{\|x^{(i)}-x^{(k)}\|^2}{2\sigma_i^2}}}$$

$$p(i|i) = 0$$

$$p_{ij} = \frac{p_{j|i} + p_{i|j}}{2n}$$

$$q_{ij} = \frac{(1 + \|f(x^{(i)}) - f(x^{(j)})\|^2)^{-1}}{\sum_{k:k \neq l} (1 + \|f(x^{(i)}) - f(x^{(l)})\|^2)^{-1}}$$

$$q_{ii} = 0$$

and where N is the number of training data points, P is the Gaussian distribution calculated in block 406, Q is a t-distribution calculated in block 410, and K is the largest number of nearest neighbors to be considered for each data point. P and Q are calculated in a batched fashion, where each batch includes both a subset of randomly sampled training data points and all the determined exemplars. The final loss function is the sum of the KL loss, the reconstruction loss from the decoder, the reconstruction loss by the exemplars, and the hinge loss weighted by user-specified hyper-parameters.

Figure 5:
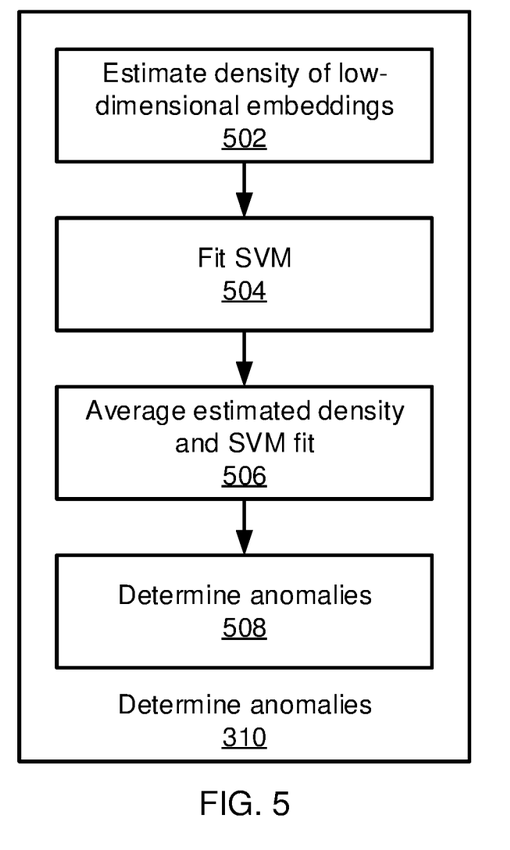
FIG. 5 is a block/flow diagram of a method for determining whether an image is anomalous in accordance with an embodiment of the present invention.

Referring now to FIG. 5, additional detail is provided regarding the determination of anomalies in block 310. Block 502 estimates the density of low-dimensional embeddings based on a standard Gaussian mixture model (GMM). Block 504 fits a standard one-class support vector machine (SVM) separately from the Gaussian mixture model on the low-dimensional embeddings of all data points. Blocks 502 and 504 can be reversed in order or can be performed concurrently. If an input image is in a low-density region of the fitted GMM (e.g., in a region with a below-threshold density), that indicates that the log-likelihood of the embedding will be small and is likely to represent an anomaly. If the one-class SVM fits a model that outputs a 1 for normal data and a −1 for abnormal data, then the SVM can also be used to mark anomalies. Block 506 averages the anomaly prediction from the GMM and the one-class SVM fit. Block 508 uses the determined combined prediction to identify anomalies in an input data set.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
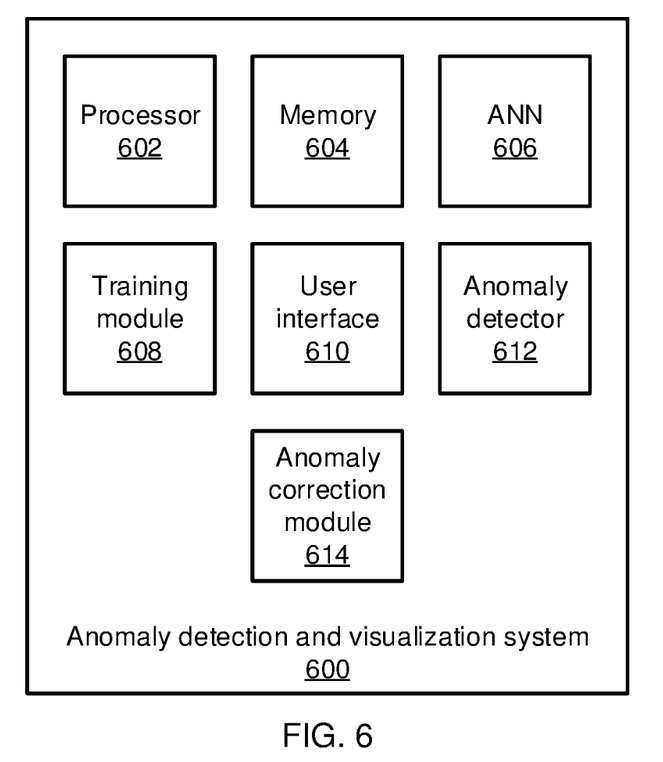
FIG. 6 is a block diagram of an anomaly detection and visualization system in accordance with an embodiment of the present invention.

Referring now to FIG. 6, an anomaly detection and visualization system 600 is shown. The system 600 includes a hardware processor 602 and memory 604. An ANN 606 is implemented either in a hardware or software embodiment, or a combination of the two. It is specifically contemplated that the ANN 606 may have an autoencoder structure, where an encoder portion of the ANN 606 converts high-dimensional input data to a low-dimensional embedding and where a decoder portion converts a low-dimensional embedding into a high-dimensional recreation of the original input data.

Training module 608 trains the ANN 606 using a set of high-dimensional training data. A user interface 610 provides visualization of a set of input data based on low-dimensional embeddings provided by the ANN 606. The low-dimensional embeddings preserve neighbor relationships between images, such that the images can be displayed on a two-dimensional field in proximity to similar other images.

An anomaly detector 612 identifies anomalous images from among a set of input images. Anomaly correction module 614 then uses the identified anomalous images to take a corrective action regarding an associated product or object, for example by automatically discarding the anomalous product.

Figure 7:
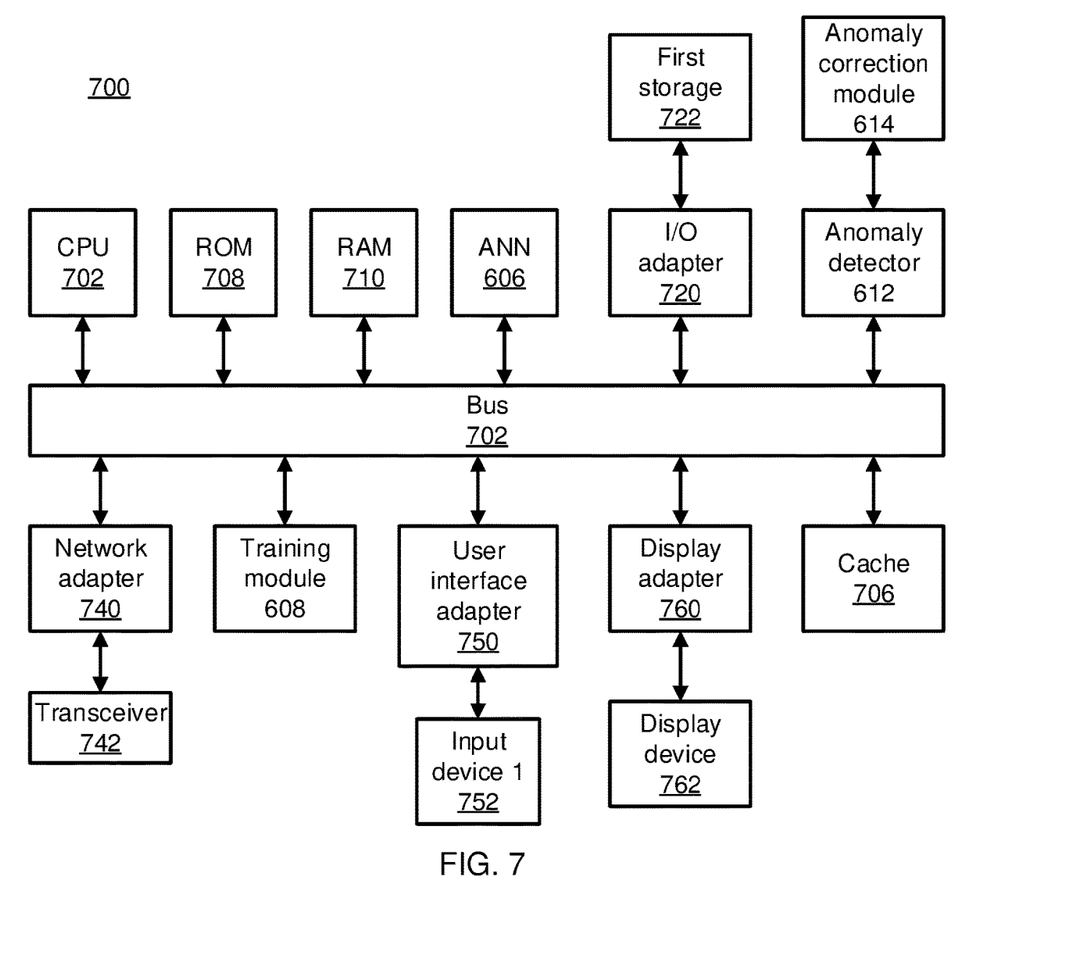
FIG. 7 is a block diagram of a processing system in accordance with an embodiment of the present invention.

Referring now to FIG. 7, an exemplary processing system 700 is shown which may represent the anomaly detection and visualization system 600. The processing system 700 includes at least one processor (CPU) 704 operatively coupled to other components via a system bus 702. A cache 706, a Read Only Memory (ROM) 708, a Random Access Memory (RAM) 710, an input/output (I/O) adapter 720, a sound adapter 730, a network adapter 740, a user interface adapter 750, the anomaly detection 612, and the training module 608, display adapter 760, the ANN 606, and the, are operatively coupled to the system bus 702.

A first storage device 722 is operatively coupled to system bus 702 by the I/O adapter 720. The storage device 722 can be any of a disk storage device (e.g., a magnetic or optical disk storage device), a solid state magnetic device, and so forth. The storage device 722 can be the same type of storage device or different types of storage devices.

A transceiver 742 is operatively coupled to system bus 702 by network adapter 740. A display device 762 is operatively coupled to system bus 702 by display adapter 760.

A first user input device 752 is operatively coupled to system bus 702 by user interface adapter 750. The user input device 752 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input device 752 can be the same type of user input device or different types of user input devices. The user input device 752 is used to input and output information to and from system 700.

Of course, the processing system 700 may also include other elements (not shown), as readily contemplated by one of skill in the art, as well as omit certain elements. For example, various other input devices and/or output devices can be included in processing system 700, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 700 are readily contemplated by one of ordinary skill in the art given the teachings of the present principles provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for detecting and correcting anomalous inputs, comprising:
   training a neural network to embed high-dimensional input data into a low-dimensional space with an embedding that preserves neighbor relationships;
   embedding a plurality of input data items into the low-dimensional space to form respective low-dimensional codes;
   determining an anomaly among the high-dimensional input data based on the low-dimensional codes; and
   correcting the anomaly.

2. The method of claim 1, wherein the high-dimensional input data comprises images of manufactured products.

3. The method of claim 2, wherein correcting the anomaly comprises automatically discarding anomalous products.

4. The method of claim 1, further comprising visualizing the high-dimensional input data based on neighbor relationships among the low-dimensional codes.

5. The method of claim 1, wherein determining the anomaly comprises estimating a density of embeddings using a Gaussian mixture model and fitting a one-class support vector machine.

6. The method of claim 1, wherein training the neural network comprises determining pairwise neighboring probabilities in a batch of high-dimensional input training data.

7. The method of claim 6, wherein training the neural network further comprises embedding each high-dimensional input training data in the batch into the low-dimensional space.

8. The method of claim 7, wherein training the neural network further comprises reconstructing high-dimensional data from the high-dimensional training data that has been embedded into the low-dimensional space.

9. The method of claim 8, wherein training the neural network further comprises minimizing a Kullback-Leiber loss function, reconstruction errors, and hinge losses.

10. A system for detecting and correcting anomalous inputs, comprising:
    a neural network configured to embed high-dimensional input data into a low-dimensional space;
    a training module configured to train the neural network to embed the high-dimensional input data with an embedding that preserves neighbor relationships;
    an anomaly detector configured to use the neural network to embed a plurality of input data items into the low-dimensional space to form respective low-dimensional codes and to determine anomaly among the high-dimensional input data based on the low-dimensional codes; and
    an anomaly correction module configured to correct the anomaly.

11. The system of claim 10, wherein the high-dimensional input data comprises images of manufactured products.

12. The system of claim 11, wherein the anomaly correction module is further configured to automatically discard anomalous products.

13. The system of claim 10, further comprising a user interface configured to visualize the high-dimensional input data based on neighbor relationships among the low-dimensional codes.

14. The system of claim 10, wherein the anomaly detector is further configured to estimate a density of embeddings using a Gaussian mixture model and fitting a one-class support vector machine.

15. The system of claim 10, wherein the training module is further configured to determine pairwise neighboring probabilities in a batch of high-dimensional input training data.

16. The system of claim 15, wherein the training module is further configured to determine embed each high-dimensional input training data in the batch into the low-dimensional space.

17. The system of claim 16, wherein the training module is further configured to determine reconstruct high-dimensional data from the high-dimensional training data that has been embedded into the low dimensional space.

18. The system of claim 17, wherein the training module is further configured to determine minimize a loss function, reconstruction errors, and hinge losses.

* * * * *